(12) United States Patent
Deane

(10) Patent No.: US 7,809,221 B2
(45) Date of Patent: Oct. 5, 2010

(54) SHADOW DETECTION IN OPTICAL TOUCH SENSOR THROUGH THE LINEAR COMBINATION OF OPTICAL BEAMS AND GREY-SCALE DETERMINATION OF DETECTED SHADOW EDGES

(75) Inventor: Peter Deane, Moss Beach, CA (US)

(73) Assignee: Poa Sana Liquidating Trust, Mountain View, CA (US)

( * ) Notice: Subject to any disclaimer, the term of this patent is extended or adjusted under 35 U.S.C. 154(b) by 825 days.

(21) Appl. No.: 11/743,627

(22) Filed: May 2, 2007

(65) Prior Publication Data

US 2008/0273019 A1    Nov. 6, 2008

(51) Int. Cl.
G02B 6/32 (2006.01)
G06F 3/042 (2006.01)

(52) U.S. Cl. .............................. 385/33; 385/12; 385/14; 385/93; 385/901; 345/176

(58) Field of Classification Search .................... 385/14, 385/31, 33, 34, 129, 130, 131, 132, 92, 93, 385/12, 901; 345/175, 176; 349/57, 58, 349/95, 193
See application file for complete search history.

(56) References Cited

U.S. PATENT DOCUMENTS

| | | | |
|---|---|---|---|
| 5,914,709 A | 6/1999 | Graham et al. | 345/179 |
| 7,099,553 B1 | 8/2006 | Graham et al. | 345/179 |
| 2003/0063775 A1 | 4/2003 | Rafii et al. | 382/106 |
| 2004/0201579 A1 | 10/2004 | Graham | 345/175 |
| 2005/0201681 A1 | 9/2005 | Payne | 385/33 |

(Continued)

FOREIGN PATENT DOCUMENTS

GB    2420620    5/2006    ............... 385/14 X (Continued)

OTHER PUBLICATIONS

U.S. Appl. No. 11/498,356, filed Aug. 2, 2006.

(Continued)

*Primary Examiner*—Brian M Healy
(74) *Attorney, Agent, or Firm*—Beyer Law Group LLP

(57) ABSTRACT

An optical based input touch display device with high resolution shadow detection using the linear splitting of waveguides among transmit and receive lenses and grey-scale calculations for shadow edge and center detection is disclosed. The apparatus includes a light source and a transmit waveguide optically coupled to the light source. The transmit waveguide includes a plurality of transmit waveguide grooves coupled to a plurality of groups of shared transmit lenses respectively. The plurality of groups of transit lenses, which are configured to generate a plurality of collimated light beams from the light source. A receive waveguide is also provided having a plurality of receive waveguide grooves coupled to a plurality of groups of shared receive lenses. The plurality of groups of receive lenses are configured to receive the plurality of collimated light beams. A photodiode array including a plurality of photodiodes are optically coupled to the plurality of receive waveguide grooves respectively. Each of the photodiodes is configured to receive light from the plurality of light beams received by the plurality of groups of receive lenses respectively. A processor is configured to detect shadow edge and/or shadow center of an interrupt in the plurality of collimated light beams.

19 Claims, 4 Drawing Sheets

U.S. PATENT DOCUMENTS

| | | | |
|---|---|---|---|
| 2005/0271319 A1 | 12/2005 | Graham | 385/14 |
| 2005/0271326 A1 | 12/2005 | Luo et al. | 385/43 |
| 2005/0271983 A1 | 12/2005 | Payne et al. | 430/321 |
| 2006/0001653 A1 | 1/2006 | Smits | 345/176 |
| 2006/0001654 A1 | 1/2006 | Smits | 345/176 |
| 2006/0002655 A1 | 1/2006 | Smits | 385/31 |
| 2008/0273019 A1* | 11/2008 | Deane | 345/176 |
| 2009/0160815 A1* | 6/2009 | Steer | 345/173 |

FOREIGN PATENT DOCUMENTS

| | | | |
|---|---|---|---|
| WO | WO 98/40844 | 9/1998 | 385/14 X |
| WO | WO 2006/060875 | 6/2006 | 385/14 X |

OTHER PUBLICATIONS

Jansen et al., "Finger Point Detection Using Gas Panel," Dec. 1, 1980, IBM Technical Disclosure Bulletin, pp. 3287-3288, XP002069118.

International Search Report mailed Aug. 7, 2008 in PCT/US2008/062241.

Written Opinion mailed Aug. 7, 2008 in PCT/US2008/062241.

* cited by examiner

SHADOW DETECTION IN OPTICAL TOUCH SENSOR THROUGH THE LINEAR COMBINATION OF OPTICAL BEAMS AND GREY-SCALE DETERMINATION OF DETECTED SHADOW EDGES

RELATED APPLICATIONS

The present invention is related to U.S. application Ser. No. 11/743,621, pending, entitled "Self-Timing Exposure Control for Optical Based Input Touch Display Devices" filed on the same day as the present application, and incorporated herein for all purposes.

BACKGROUND

1. Field of the Invention

The present invention relates to optical based input touch display devices, and more particularly, to shadow detection for optical based input touch devices using linear splitting of optical beams and grey-scale calculations for detecting the shadow edge and center of an input device.

2. Background of the Invention

User input devices for data processing systems can take many forms. Two types of relevance are touch screens and pen-based screens. With either a touch screen or a pen-based screen, a user may input data by touching the display screen with an input device, such as a stylus, pen or finger.

One conventional approach to providing a touch or pen/stylus-based input system is to overlay a resistive or capacitive film over the display screen. This approach has a number of problems. Foremost, the film causes the display to appear dim and obscures viewing of the underlying display. To compensate, the intensity of the display screen is often increased. However, in the case of most portable devices, such as cell phones, personal digital assistants and laptop computers, the added intensity requires additional power, reducing the life of the battery of the device. The films are also easily damaged. In addition, the cost of the film scales dramatically with the size of the screen. With large screens, the cost is therefore typically prohibitive.

Another approach to providing touch or pen/stylus-based input systems is to use an array of source Light Emitting Diodes (LEDs) along two adjacent X-Y sides of an input display and a reciprocal array of corresponding photodiodes along the opposite two adjacent X-Y sides of the input display. Each LED generates a light beam directed to the reciprocal photodiode. When the user touches the display, with either an input device, the interruption in light beams are detected by the corresponding X and Y photodiodes on the opposite side of the display. The data input is thus determined by calculating the coordinates of the interruptions as detected by the X and Y photodiodes. This type of data input display, however, also has a number of problems. A large number of LEDs and photodiodes are required for a typical data input display. The position of the LEDs and the reciprocal photodiodes also need to be aligned. The relatively large number of LEDs and photodiodes, and the need for precise alignment, make such displays complex, expensive, and difficult to manufacture.

Yet another approach involves the use of polymer waveguides to both generate and receive beams of light from a single light source to a single array detector. With known polymer waveguides, an array of light transmitting lenses, each coupled to the light source through a waveguide, is positioned on one side of touch input display. An opposing array of receive lenses are positioned on the opposite side of the display. Each of the receive lenses have a corresponding waveguide that is optically coupled to a light detector such as a photodiode. During operation, light from the light source is transmitted through the waveguide and the transmit lenses, creating a plurality of collimated light beams adjacent the surface of the display. On the opposing side of the display, the lenses receive the collimated light, which is conveyed to the light detectors through the waveguides. When a data entry is made, using an input device contacting the display, the collimated light at the point of contact is interrupted. The light detectors determine the location of the interrupt, and based on the location, determine the data entry. For more information on polymer waveguides, see for example U.S. patent application Ser. No. 11/498,356, US patent publications 2005/0271319, 2006/0001653, 2006/0002655, 2006/0001654, 2005/0271326, 2005/0271983, 2005/0201681 and U.S. Pat. No. 7,099,553, all incorporated herein by reference for all purposes.

A number of issues are associated with the aforementioned touch screens using polymer waveguides. Foremost, each transmit and receive channel requires a dedicated waveguide. Since a significant number of transmit and receive channels are needed to obtain the necessary input resolution, a large number of waveguides are required. Touch screens are often used with small to medium sized consumer items, such as cell phones and PDAs. The optical touch sensor therefore typically needs to fit into a small space, ideally integrated into the display. Since the waveguide structures are usually planar, the number of waveguides used, and hence the system resolution, can be limited by the area available for the waveguide structures.

An optical based input touch display device with high resolution shadow detection using the linear splitting of waveguides among transmit and receive lenses and grey-scale calculations for shadow edge and center detection is therefore needed in order to minimize the space occupied by the waveguide structures.

SUMMARY OF THE INVENTION

An optical based input touch display device with high resolution shadow detection using the linear splitting/combining of waveguides among transmit/receive waveguide structures and grey-scale calculations for shadow edge and center detection is disclosed. The apparatus includes a light source and a transmit waveguide optically coupled to the light source. The transmit waveguide includes a plurality of transmit waveguide grooves coupled to a plurality of groups of shared transmit lenses respectively. The plurality of groups of transmit lenses, which are configured to generate a plurality of collimated light beams of equal intensity from the light source. A receive waveguide is also provided having a plurality of receive waveguide grooves coupled to a plurality of groups of shared receive lenses. The plurality of groups of receive lenses are configured to receive and linearly combine the plurality of collimated light beams. A photodiode array including a plurality of photodiodes are optically coupled to the plurality of receive waveguide grooves respectively. Each of the photodiodes is configured to receive light from the plurality of light beams received by the plurality of groups of receive lenses respectively. A processor is configured to detect shadow edge and/or shadow center of an interrupt in the plurality of collimated light beams.

BRIEF DESCRIPTION OF THE DRAWINGS

Like elements are designated by like reference numbers in the Figures.

DETAILED DESCRIPTION OF THE PREFERRED EMBODIMENTS

Figure 1:
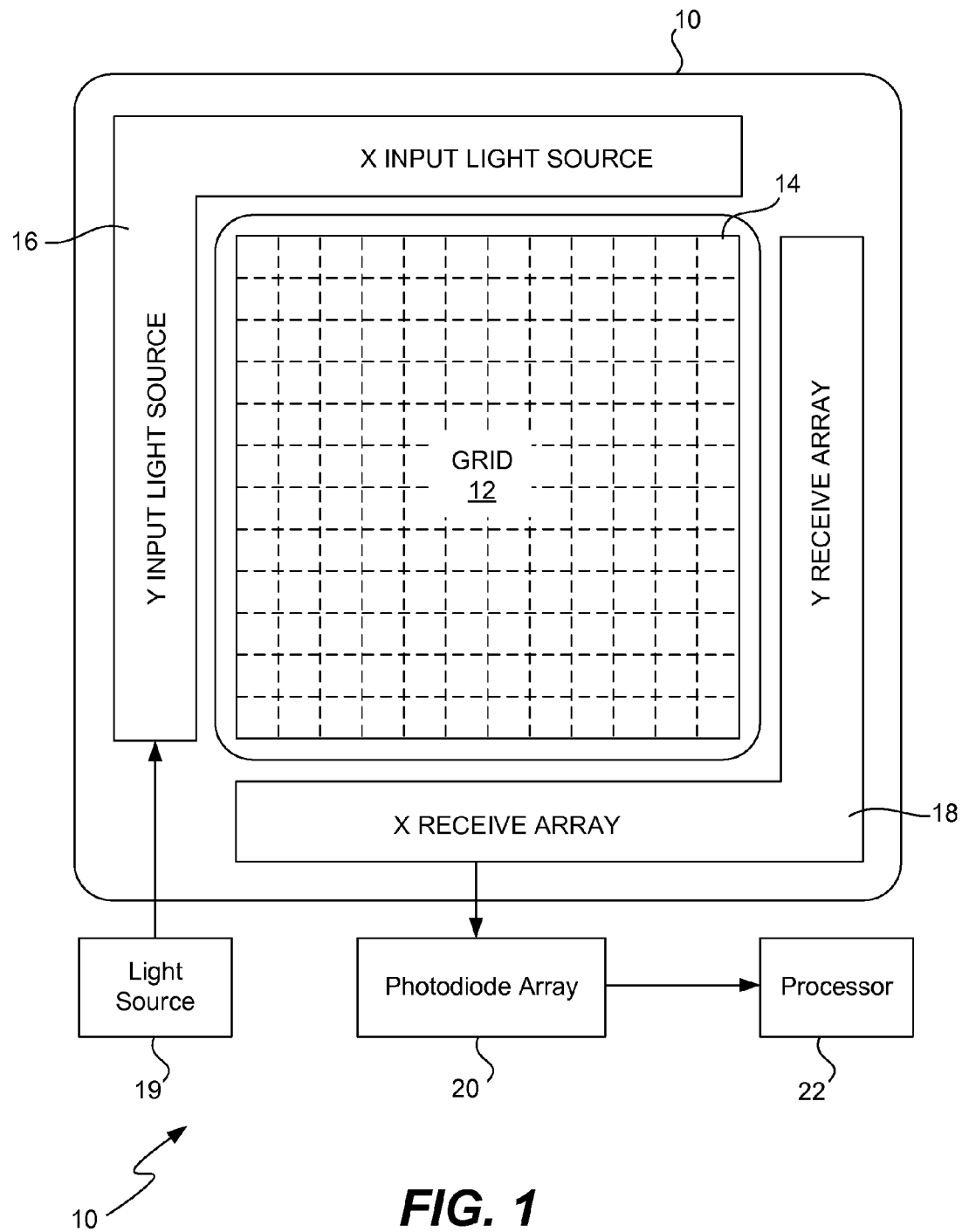
FIG. 1 is a perspective view of a touch display using polymer waveguides according to the present invention.

Referring to FIG. 1, a touch screen data input device is shown. The data input device 10 defines a "grid" 12 of collimated light beams in the free space adjacent to a touch screen 14. The grid 12 (represented by the horizontal and vertical dashed lines) of light is created by a transmit polymer waveguide 16 provided on first X and Y sides of the screen 14. A receive polymer waveguide 18 is provided on the opposing X and Y sides of the screen 14 and is configured to receive the collimated beams of light. A light source 19, such as a laser diode, is optically coupled to the transmit waveguide 16. A photodiode array 20 is optically coupled to the individual waveguides of the receive polymer waveguide 18. A processor 22, which is coupled to the photodiode array 20, is provided to determine the X and Y coordinate of any interrupt in the grid 12 of collimated light caused during a data entry.

Figure 2:
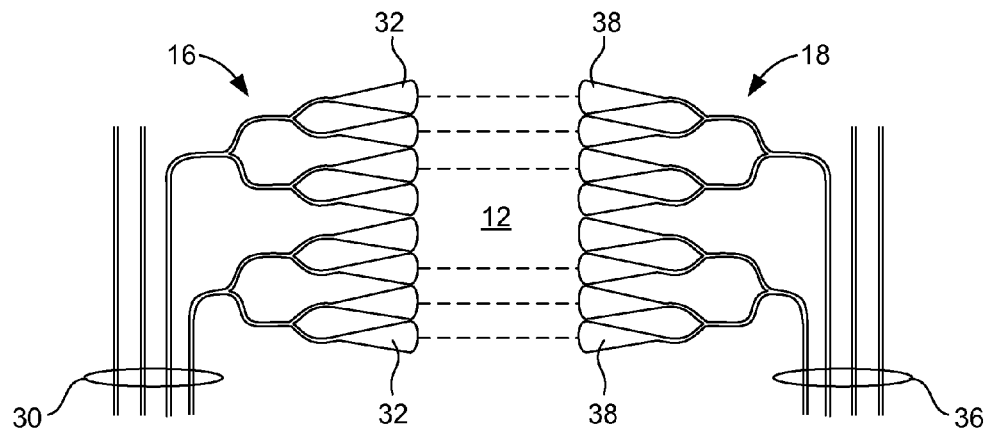
FIG. 2 is a diagram illustrating linear optical splitting and combining waveguides used in the touch display of the present invention.

Referring to FIG. 2, a diagram illustrating the transmit waveguide 16 and the receive waveguide 18 according to one embodiment is shown. The transmit waveguide 16 includes a plurality of waveguide grooves 30 and a plurality of lenses 32. In the embodiment illustrated, the light transmitted from the light source 19 (not shown) is transmitted through each waveguide groove 30 and is optically split or shared among four lenses 32. In one embodiment, the splitting is linear, meaning each lens 32 receives the same amount of light and generates a collimated beam of light of equal intensity. In other embodiments, the splitting can be non-linear. On the receive side, the waveguide 18 also includes a plurality of waveguide grooves 36 and lenses 38. The collimated light received from each shared lens 38 is linearly combined and provided to the common waveguide groove 36. The photodiodes of the array 20 are optically coupled to each of the waveguide grooves 36 respectively. It should be noted that for the sake of simplicity, only a few of the grooves 30 and 36 and lenses 32 and 38 are illustrated. In most actually embodiments, a larger number of both would be provided.

It should be noted that in the embodiment shown in FIG. 2, the ratio of splitting between lenses and waveguide grooves is four to one (4:1) or $2^N$ where N=2. In alternative embodiments, the ratio can be altered, for example anywhere from $2^N$ where N ranges from 1 to 6 (i.e., 2 to 64 lenses per waveguide groove). Regardless of the number of lenses used, the primary goal in one embodiment is the linear generation of generally uniform intensity collimated light beams. In other embodiments, the light beams can be of non-uniform intensity. In yet other embodiments, the ratio on the transmit side and the receive side do not necessarily need to match. In one specific example, eight lenses 32 can be shared among one groove 30 on the transmit side, while four lenses 38 are shared among one groove 36 on the receive side. In other examples, anywhere from two to sixty four or more lenses 32/36 per groove 30/36 can be used on either the transmit and/or the receive side. Again, regardless of the number of lenses provided on the transmit and receives sides, the primary goal of the lenses in one embodiment is the linear combination of the light received at each lens. In other embodiments, the combining of the received light can be non-linear. In various other embodiments, the lenses have an aperture ranging from 50 microns to 5 millimeters.

Figure 3:
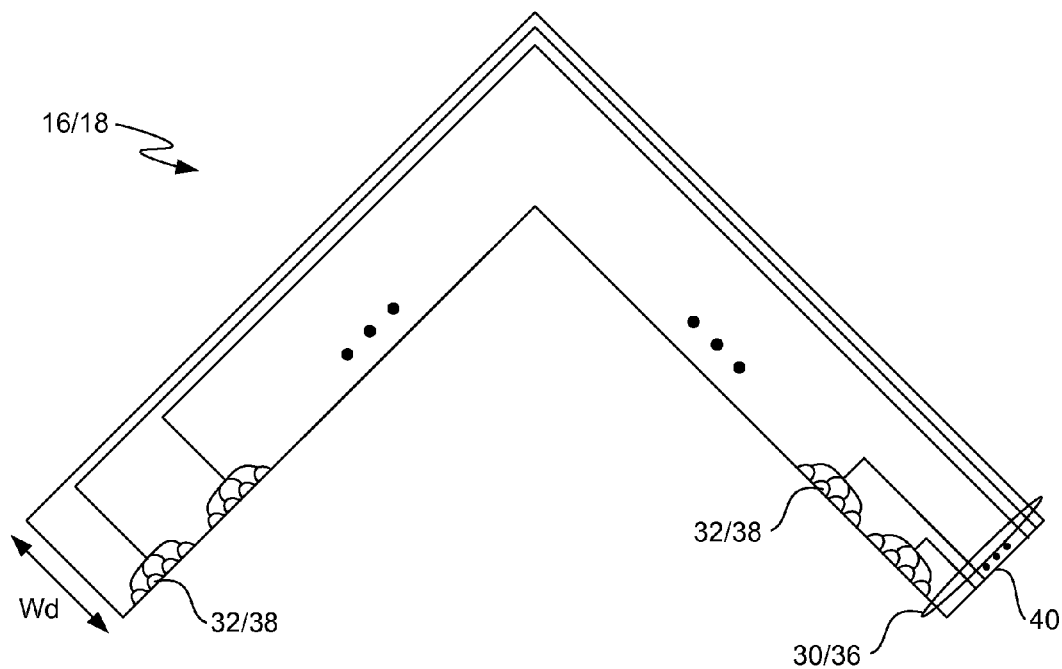
FIG. 3 is a perspective view illustrating an optical splitting waveguide according to the present invention.

Referring to FIG. 3, a perspective view of either waveguide 16/18 is shown. In this embodiment, the waveguide 16/18 is L-shaped and includes the lenses 32/38 arranged along the inner periphery. The grooves 30/36 are coupled to the lenses 32/38 at one end and travel to the optical coupling end 40 of the waveguide. At the optical coupling end 40, the grooves 30/36 are optically coupled to either a light source 19 or the photodiode array 20, depending if the waveguide is used as a transmitter 16 or receiver 18 respectively. The grooves 30/36 run parallel to one another along the outer edge opposite the lenses 32/38 along the length of the waveguide.

With the linear sharing arrangement described above, the number of grooves 30/36 required per waveguide 16/18 is significantly reduced. In the example shown in FIG. 2 for example, the number of grooves is reduced to by a factor of four since each groove is optically coupled to four lenses. The width "Wd" of the waveguides 16/18 can therefore be significantly reduced. Also the number of photodiodes on the array 20 can also be reduced along with the size or processing power of the processor 22.

Figure 4:
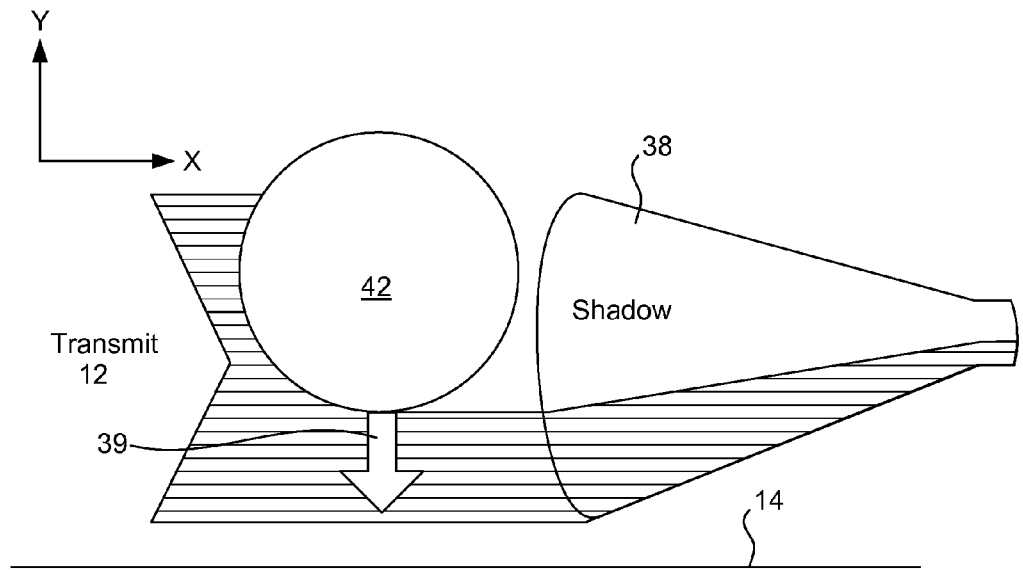
FIG. 4 is a top view diagram illustrating an input device interrupting a collimated beam of light in the touch display of the present invention.

Referring to FIG. 4, a top view diagram illustrating an input device interrupting a collimated beam of light in the touch display of the present invention is shown. During operation, a user will make data entries to the device 10 using some type of an input device 42, such as a pen, stylus or their finger. As the entry is made, the input device 42 is moved laterally across the surface of the touch screen 14 in the X-Y plane. In the example illustrated, the input device is being moved in the Y direction, as signified by the arrow 39. It should be well understood that during normal operation, the input device will be moved in both the X and Y directions along the X-Y plane defined by the surface 14 of the input device 10.

The amount of light from the collimated beam of light 12 received at the lens 38 is inversely proportional to the amount of light blockage caused by the input device 42. When the input device 42 is not directly in front of the lens 38 and there is no blockage, resulting lens 38 receiving the full intensity of the collimated light. On the contrary when the input device 42 is fully blocking or interrupting the collimated light beam, the lens 38 receives little to no light. In the position shown in the figure, the input device is partially blocking the light, meaning the lens 38 receives only a portion of the collimated beam, as illustrated by the shaded area.

Figure 5:
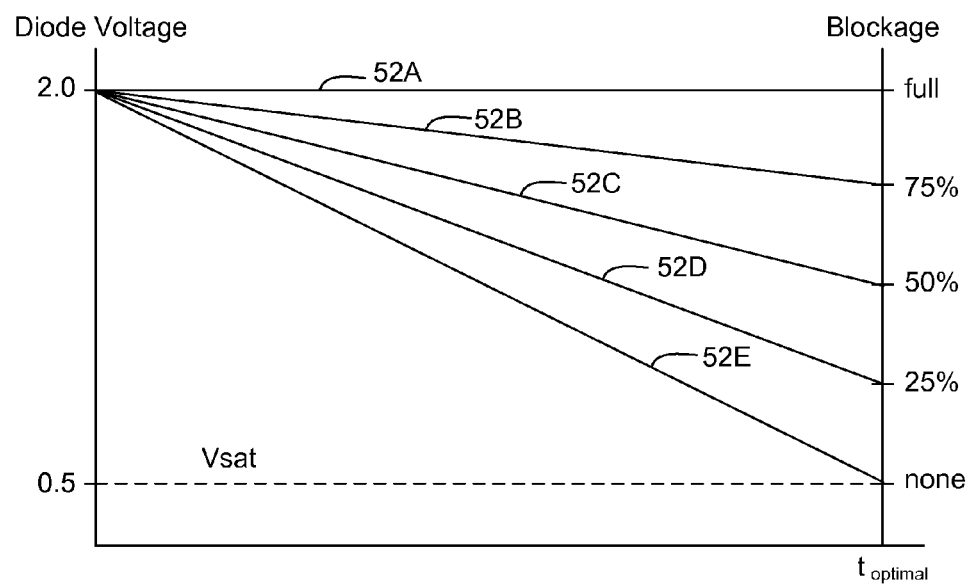
FIG. 5 is a plot illustrating the voltage output versus received light for a photodiode light detector used in the touch display of the present invention.

Referring to FIG. 5, a plot 50 illustrating the voltage output versus received light for a photodiode light detector used in the touch display of the present invention is shown. Photodiodes typically generate an output voltage that is an integral of the received optical flux. The optical flux is defined by exposure time multiplied by the optical power of the received light. In the embodiment shown in the plot 50, the photodiode is pre-charged to 2.0 volts and generates a voltage of 0.5 volts upon saturation. The output voltage 52 is some linear value between the pre-charge and saturation voltages, depending on the amount of received optical flux. The plot 50 shows linear output voltages 52A through 52E, each representing the output of the diode depending on the degree of blockage. Linear voltage outputs 52A through 52E show full blockage, 75 percent, 50 percent, 25 percent and no blockage respectively. The exposure time ($t_{optimal}$) is the exposure time selected to prevent the diode from becoming saturated at full light exposure. At the end of each $t_{optimal}$ cycle, the diode is pre-charged to 2.0 volts.

In the context of the subject application, the term 'grey scale" refers to the inverse proportionality of the light input at the receive lenses 38 versus the voltage output 52A through 52E at the corresponding photodiode in the array 20. In other words, the more light received at the diode, the smaller the magnitude of the voltage output of the diode, and vice-versa. As discussed in detail below, this grey scaling effect can be used for height and shadow detection.

Figures 6A, 6B:
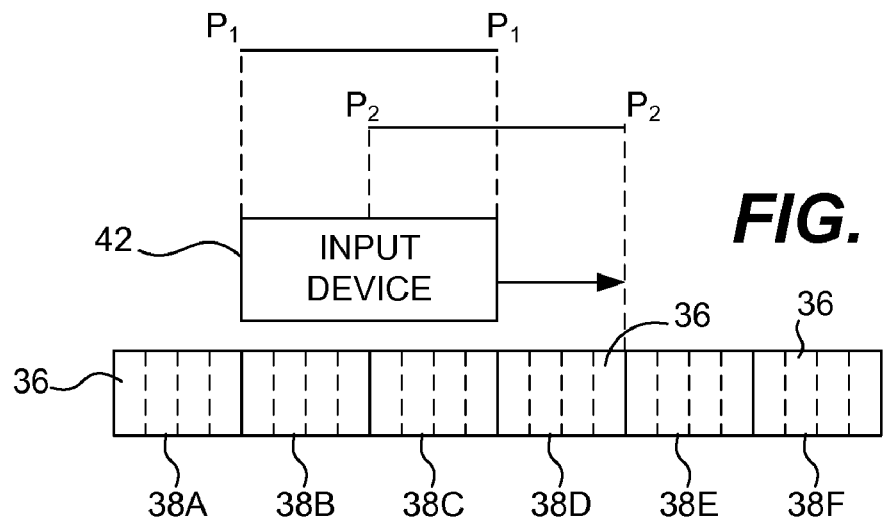
FIGS. 6A and 6B are diagrams illustrating grey-scale edge and center shadow detection in accordance with the present invention.

Referring to FIG. 6A, a diagram illustrating grey-scale shadow detection in accordance with the present invention. FIG. 6A shows an input device 42 being laterally moved between position P1 and P2 relative to a number of adjacent receive lenses 38. It should be noted that for the sake of illustration, the value of N in this example is two, or there are four lenses 38 per receive waveguide 36 (i.e., $2^2=4$). The width of the input device 42 is ($2^{2+1}$) lenses wide, or a total of eight lenses 38 wide. With this arrangement, the grey scale of each lens 38 twenty five percent (25%). In other words, when the input device 42 blocks four, three, two, one or none of the lenses 38 of a given waveguide 36, the grey scale output will be 1, 0.75, 0.5, 0.25, and 0.0 respectively. In position P1, the input device 42 is blocking any light from reaching the lenses 36 of waveguides 38B and 38C. On the other hand, the lenses 36 of waveguides 38A and 38D-38F are not blocked and receive the collimated light unobstructed. As the input device is moved from position P1 to position P2, the amount of light received by the lenses 36 of waveguides 38B through 38D changes.

Referring now to FIG. 6B, a table that illustrates the voltage output of the photodiodes is shown. Each column A through F corresponds to the waveguides 38A through 38F respectively. Each row signifies an increment of time between when the input device 42 is moved between position P1 and position P2. The entry at the intersection of each column and row includes a number that signifies the approximate voltage output of the photodiode that receives the light from waveguide 38A through 38F respectively. As a reminder, an entry of ("1") indicates that the waveguide 38 is providing little to no light to the photodiode (i.e., generating two volts) because all of its lenses 36 are blocked from receiving light, whereas an entry of ("0") means the none of the lenses 36 are being blocked.

In the first row when the input device 42 is at P1, the entry for column B and C is (1), and (0) for the remaining columns A and D through F. As the input device 42 is moved from left to right, lens 38B is no longer fully blocked and begins to receive some light, lens 38C remains fully blocked, and lens 38D becomes partially blocked. As a result, the entry for the three lenses 38b, 38C and 38D in the second row is (0.75, 1, and 0.25). As the input device 42 continues its movement to position P2, the entry for the three lenses 38b, 38C and 38D changes to (0.5, 1, 0.5), (0.25, 1, 0.75) and (0, 1, 1) for the third, fourth and fifth rows respectively.

As the shadow edge of the input device 42 moves across a group of lenses 38 sharing a waveguide groove 36, the total linear power of the light received is reduced in proportion to the shadow. By choosing the width of the combined group of lenses 38 to be less than half the smallest recognized shadow size, the full occlusion of the group of lenses can be achieved. As a result, the shadow center of the input device 42 can be accurately determined. The aspect ratio (i.e., aperture) of the lenses 38 are therefore dictated by the desired resolution. In one embodiment, if a desired resolution of 0.125 millimeters is desired, then lenses 38 having an aperture of 2× or 0.25 millimeters is required.

Polymer waveguides 16 can be made in a number of known methods. See for example U.S. patent application Ser. No. 11/498,356, US patent publications 2005/0271319, 2006/0001653, 2006/0002655, 2006/0001654, 2005/0271326, 2005/0271983, 2005/0201681 and U.S. Pat. No. 7,099,553, all incorporated herein by reference for all purposes.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations and equivalents as fall within the true spirit and scope of the present invention.

What is claimed is:

1. An apparatus, comprising;
   a optical waveguide, the optical waveguide including:
   a waveguide groove formed in the optical waveguide; and
   a plurality of lenses optically coupled to the waveguide groove so that either light received by the plurality of lenses is combined in the waveguide groove or light transmitted by the waveguide groove is split among the plurality of lenses.

2. The apparatus of claim 1, wherein the combining and the splitting of the received or the transmitted light is linear among the plurality of lenses.

3. The apparatus of claim 1, wherein the combining and the splitting of the received or the transmitted light is non-linear among the plurality of lenses.

4. The apparatus of claim 1, wherein the plurality of lenses equals $2^N$, where n ranges from one to six.

5. The apparatus of claim 1, wherein the plurality of lenses have an aperture ranging from 50 microns to 5 millimeters.

6. The apparatus of claim 1, wherein the waveguide is L-shaped and is configured to either receive or generate collimated light beams in the X and Y directions.

7. The apparatus of claim 1, further comprising a plurality of the waveguide grooves, each of the waveguide grooves having the plurality of lenses optically coupled thereto.

8. An apparatus, comprising:
   a light source;
   a transmit waveguide optically coupled to the light source, the transmit waveguide having a plurality of transmit waveguide grooves coupled to a plurality of groups of shared transmit lenses respectively, the plurality of groups of transit lenses configured to generate a plurality of collimated light beams from the light source;
   a receive waveguide having a plurality of receive waveguide grooves coupled to a plurality of groups of shared receive lenses, the plurality of groups of receive lenses being configured to receive the plurality of collimated light beams;
   a photodiode array including a plurality of photodiodes optically coupled to the plurality of receive waveguide grooves respectively, each of the photodiodes configured to receive light from the plurality of light beams received by the plurality of groups of receive lenses respectively; and
   a processor configured to detect shadow edge and/or shadow center of an interrupt in the plurality of collimated light beams.

9. The apparatus of claim 8, wherein the collimated light beams are transmitted and received in one or more of the following: the X direction; the Y direction; or the X and Y directions.

10. The apparatus of claim 8, further comprising a touch screen of a data input device, wherein the collimated light beams are transmitted and received adjacent the touch screen device.

11. The apparatus of claim 8, wherein the plurality of shared groups of transmit lenses each comprises $2^N$ lenses where N ranges from one to six.

12. The apparatus of claim 8, wherein the plurality of shared groups of received lenses each comprises $2^N$ lenses where N ranges from one to six.

13. The apparatus of claim 8, wherein plurality of shared groups of transmit lenses have an aperture ranging from 50 microns to 5 millimeters.

14. The apparatus of claim 8, wherein plurality of shared groups of receive lenses have an aperture ranging from 50 microns to 5 millimeters.

15. The apparatus of claim 8, wherein the photodiodes generate voltage signals in proportion to the amount of the receive light from the plurality of light beams received by the plurality of groups of receive lenses respectively.

16. The apparatus of claim 15, wherein the processor detects the shadow edge and/or shadow center of an interrupt in the plurality of collimated light beams from the voltage signals in proportion to the amount of the receive light from the plurality of light beams received by the plurality of groups of receive lenses respectively.

17. The apparatus of claim 1, wherein the optical waveguide is made from polymer and the waveguide groove is formed in the polymer.

18. The apparatus of claim 1, wherein the transmit waveguide and the receive waveguide are both polymer waveguides.

19. The apparatus of claim 1, wherein the optical waveguide is made from a piece molded substrate with the plurality of lenses and the waveguide groove molded into the substrate and an optically transparent material filling the waveguide groove.

* * * * *